Jan. 21, 1930.  L. ADAMS  1,744,193

LIQUID SAMPLER

Filed Sept. 1, 1927

INVENTOR.
Lynchburg Adams,
BY
ATTORNEY.

Patented Jan. 21, 1930

1,744,193

UNITED STATES PATENT OFFICE

LYNCHBURG ADAMS, OF RICHMOND, CALIFORNIA, ASSIGNOR TO UNION OIL COMPANY OF CALIFORNIA, OF LOS ANGELES, CALIFORNIA, A CORPORATION OF CALIFORNIA

LIQUID SAMPLER

Application filed September 1, 1927. Serial No. 216,933.

This invention relates to devices which are employed for the purpose of taking samples of liquid from tank cars, storage tanks or other containers at points below the surface of the liquid such as at the bottom of the tank or container.

The object of the invention is to provide a device of this type which is simple and efficient in operation and which will obtain a true sample or "core" of liquid in a tank or other receptacle especially where the quality of oil in the bottom of the tank differs from the top with respect to its water and B. S. content.

Briefly stated, the invention comprises a casing or container, a valve within the casing to retain a sample, means for holding the valve in open position as the device is lowered through the liquid, and automatic means to release said valve and enable it to close. The invention further comprises a casing containing a valve having a stem, means for holding said valve in open position, said means including a detent on the stem and means movable transversely thereof to engage said detent. Means is also provided for releasing the holding means when the sampler has reached a predetermined level, such as the bottom of the tank. In a preferred form, the holding means comprises a spring actuated pin, ball or other plunger which engages the detent, and the releasing means comprises a depending member adapted to strike the bottom of the tank to dislodge the plunger from the detent and thereby release the valve. Preferably, the valve has a stem on each side, the plunger co-operating with one stem, and a spring being provided on the other stem to positively close the valve when released.

Referring to the accompanying drawings which disclose certain embodiments of the invention by way of illustration, Fig. 1 is a vertical section taken on line 1—1 of Fig. 2;

Figure 1:
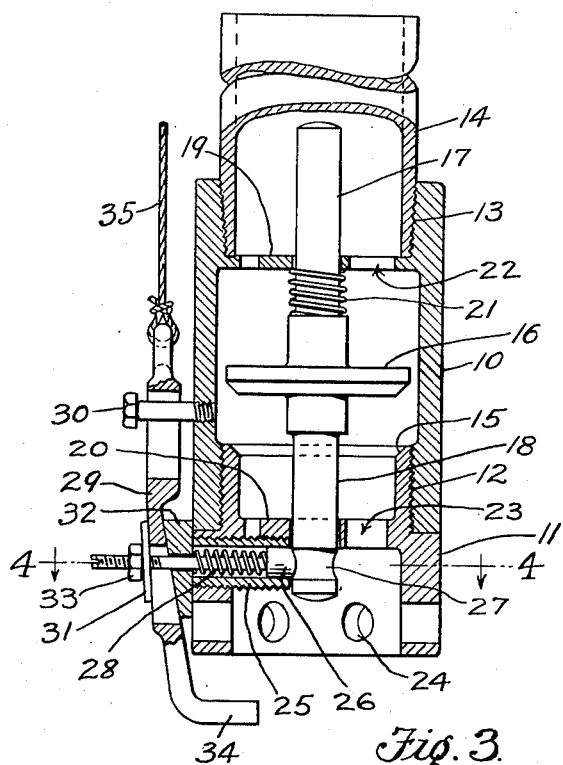
Figure 2:
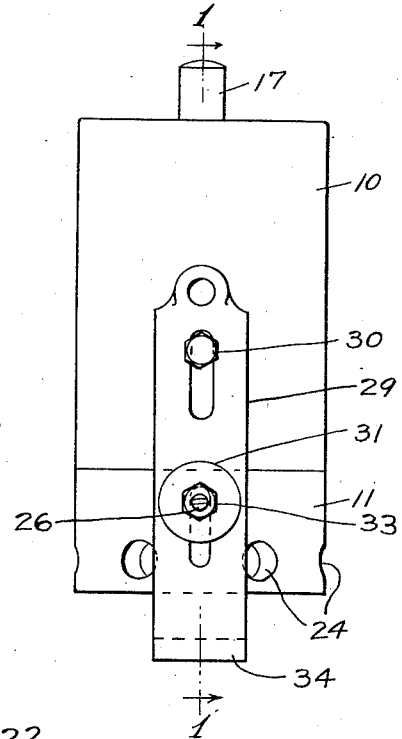
Fig. 2 is a side view thereof.
Figure 3:
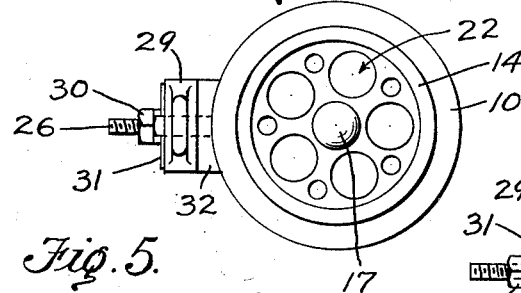
Fig. 3 is a plan view.
Figure 4:
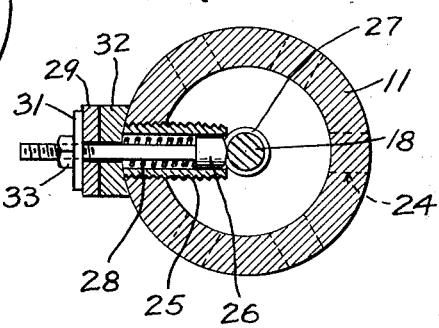
Fig. 4 is a cross section on line 4—4 of Fig. 1 showing locking mechanism.
Figure 5:
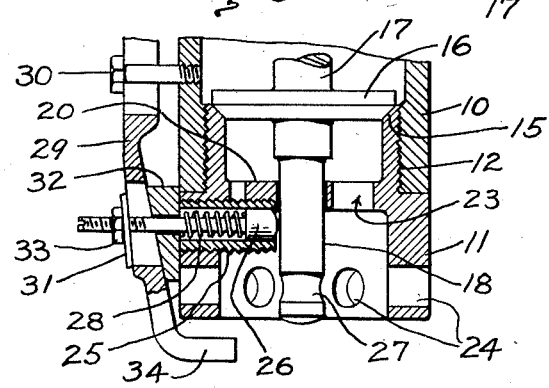
Fig. 5 is a section similar to that of Fig. 1 showing the valve in closed position.

As shown in Fig. 1, the body or casing of the valve is made in two open-ended sections 10 and 11 screwed together at 12, the upper portion 10 being threaded at 13 for attaching a sampler tube 14 which may be of any desired length and preferably long enough to extend from the bottom to the surface of the liquid. The lower portion 11 of the valve casing contains the valve seat 15 for the valve 16, above and below which project the valve stems 17 and 18 which are guided by means of centrally disposed holes in spiders 19 and 20 respectively, a compression spring 21 being provided around the upper valve stem 17 to urge the valve against its seat. A plurality of apertures 22 provided in the spider 19 of the upper casing section admit liquid into the sampler tube, and similar passages 23 in the spider 20 of the lower casing section admit liquid into the valve housing, while holes 24 may be provided to facilitate the passage of the liquid into the lower casing section.

Screwed into the side of the lower section 11 is a tubular guide 25 for a plunger 26 which engages in an annular groove or detent 27 in the valve stem 18, a compression spring 28 being provided to force the plunger against the valve stem. A steel slide 29 is vertically disposed outside of the casing, and is guided by means of a cap screw 30 and also by means of the stem of the plunger 26, these being received in slots as shown. The central portion of the slide is tapered and wedge-shaped and slides between a flat washer 31 and a wedge-shaped washer 32 to actuate the plunger 26 and a nut 33 retains the slide 29 on the stem of the plunger. In order to provide a suitable form of stop to engage the bottom of the receptacle, the lower end of said slide may be bent over in the form of a foot 34 as best seen in Fig. 1.

To obtain a sample of the liquid in a tank, the steel slide 29 is placed in its lowest position on the casing and the valve is raised to its upper or open position, the steel plunger 26 thus engaging in the groove 27 of the valve stem and thereby retaining the valve in open position. Then, upon lowering the device into the tank, a true sample of the liquid at each level in the tank is admitted through the holes 23 and passes into the sampler tube 14 through holes 22 until the foot 34 of the slide strikes the bottom of the tank whereby the slide is moved upward relative to the valve. The wedging action of the slide against the wedge-shaped washer 32 forces the plunger 26 outward and releases the valve which then is immediately closed by the action of the compression spring 21 above it. The valve being now closed, the sample of liquid is secured in the tube and the sampler may be safely removed from the tank. By attaching a cord 35 to slide 29, the valve may be tripped at any level.

While the device described and shown represents a desirable embodiment of the invention, nevertheless it is obvious that changes may be made and parts omitted without departing from the spirit of the invention. Therefore, it is to be understood that the above disclosure is merely illustrative of the generic invention and is not to be considered as limiting, many variations being possible within the scope of the following claims.

I claim:

1. In a liquid removing device, a liquid receiving casing, a valve operatively disposed within the liquid receiving casing, means for holding the valve in open position, and means adapted on contact with a vessel containing liquid to be sampled to release said valve.

2. In a liquid sampler, a liquid receiving casing having a valve seat therein, a valve operatively disposed in said liquid receiving casing, valve stems projecting from each side of said valve, a guide in said casing for said valve stem, means engaging one of said stems for releasably retaining said valve in open position and means engaging the other stem for closing said valve against its seat when said retaining means is released.

3. In a liquid sampler, a casing, a valve therein having a stem, a plunger in said casing, a detent on said valve stem, means for retaining said plunger against said detent when the valve is in open position and a foot adapted for releasing said plunger from said detent on contact with a vessel containing liquid to be sampled and means for moving said valve axially of said valve stem to closed position.

4. In a liquid sampler a casing, a valve therein having a stem, a detent on said stem, means to engage said detent and movable transversely of said stem to retain said valve in open position and a foot adapted on contact with a vessel containing liquid to be sampled to release said valve.

5. In a liquid sampler, a casing, a valve therein having a stem, a detent on said valve stem, means to engage said detent and movable transversely of said stem to retain said valve in open position and a foot adapted on contact with a vessel containing liquid to be sampled to disengage said engaging means from said detent.

6. In a liquid sampler, a casing, a valve therein having a stem, a detent on said valve stem, means to engage said detent and movable transversely of said stem to retain said valve in open position and a foot engaging said detent-engaging means and adapted to positively withdraw the latter from said detent on contact with a vessel containing liquid to be sampled.

7. In a liquid sampler, a casing, a valve therein having a stem, a plunger in said casing, a detent on said valve stem, means for retaining said plunger against said detent when the valve is in open position, a slidable member for releasing said plunger from said detent, and means for closing said valve.

8. In a liquid sampler, a liquid receiving casing, a valve operatively disposed therein having a stem, a detent on said valve stem, means to engage said detent, and resilient means to urge said engaging means into engaging position, said engaging means being reciprocable transversely of said stem, means to disengage said detent and means for urging said valve into closed position when said detent is disengaged.

9. In a liquid sampler, a casing, a valve therein having a stem, a detent on said stem, means reciprocable transversely of said stem to engage said detent, resilient means to urge said engaging means into engaging position and a foot adapted on contact with a vessel containing liquid to be sampled to disengage said engaging means.

10. In a liquid sampler, a casing having a valve seat, a valve therein having a stem, a plunger in said casing, a detent on said valve stem, a spring for retaining the plunger against the detent, a wedge-shaped slidable member for releasing said plunger from said detent and a spring for closing said valve against its seat when said plunger has been released.

11. A sampler according to claim 10, wherein said slidable member has a depending portion adapted to strike the bottom of a receptacle for actuation of the member when the sampler is lowered into the receptacle.

12. In a liquid sampler, a casing having a valve seat, a valve therein having two projecting stems, guides for said valve stems in said casing, an annular groove on one of said stems, a spring on other of said stems to urge the valve against its seat, a plunger to engage in the circular groove for retaining the valve in open position, a spring on said plunger to urge said plunger against the valve stem, a wedge-shaped slidable member having a depending portion below the casing, said slidable member being adapted to release the plunger when its depending portion strikes the bottom of a receptacle.

13. In a liquid removing device, a liquid receiving casing, a valve operatively disposed within the liquid receiving casing and mounted to move longitudinally of the casing, means for holding the valve in open position, and means adapted to contact a vessel containing liquid to be sampled to release the valve.

Signed at Oleum, in the county of Contra Costa, and State of California, this 24th day of August, A. D. 1927.

LYNCHBURG ADAMS.